F. O'NEILL, Jr.
FIBROUS PLANT DECORTICATING MACHINE.
APPLICATION FILED NOV. 28, 1917. RENEWED FEB. 13, 1922.
1,423,357.
Patented July 18, 1922.
3 SHEETS—SHEET 2.
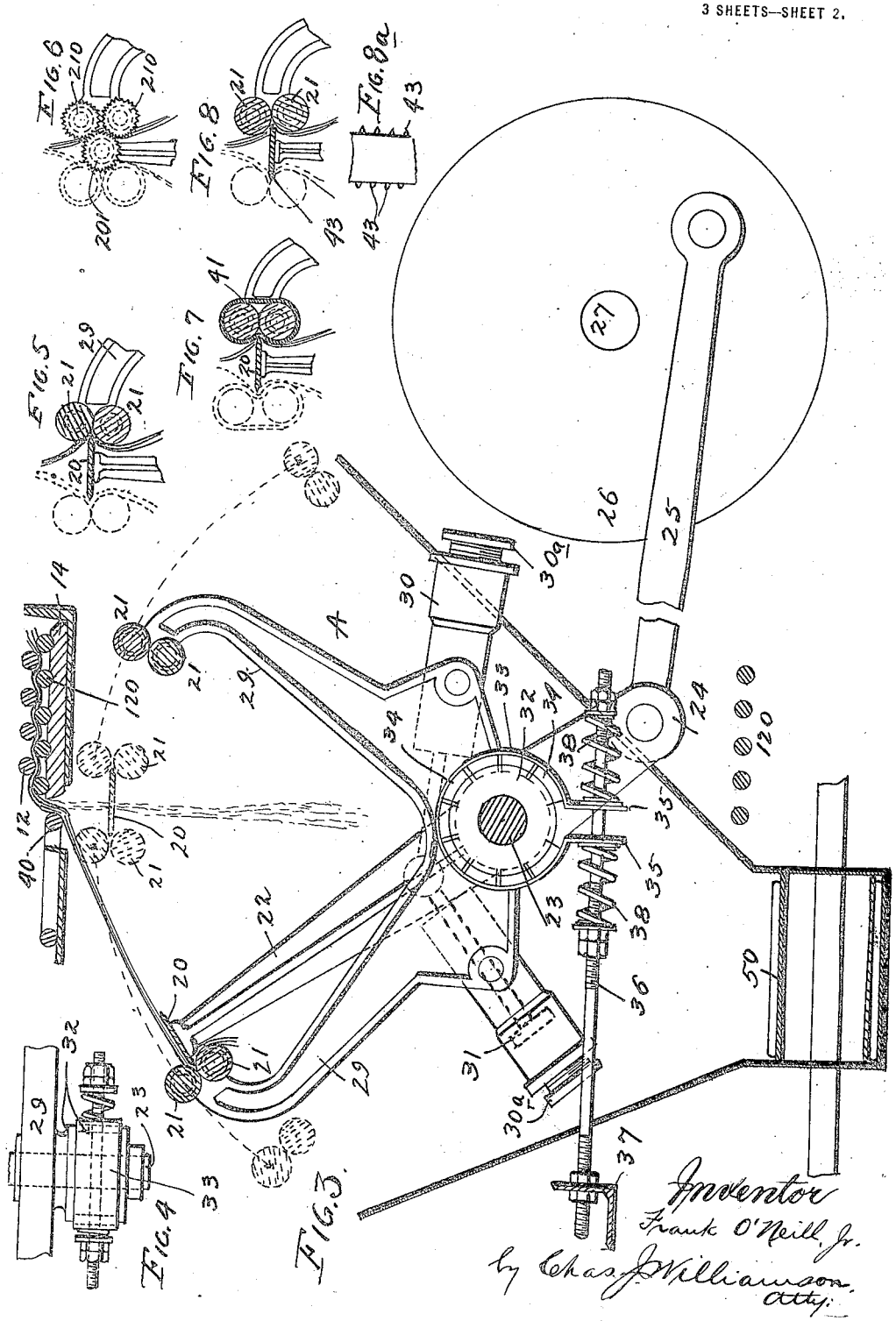

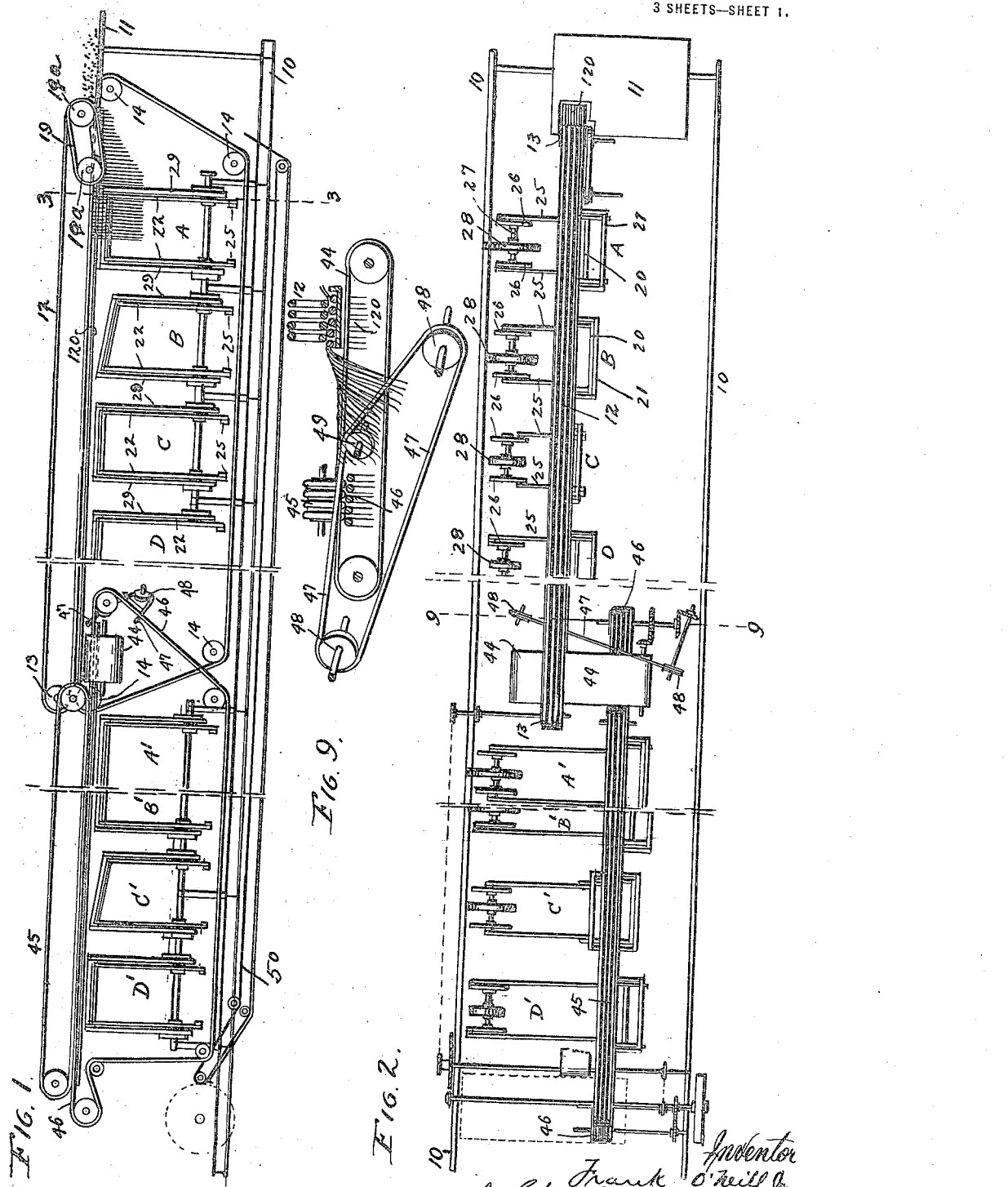

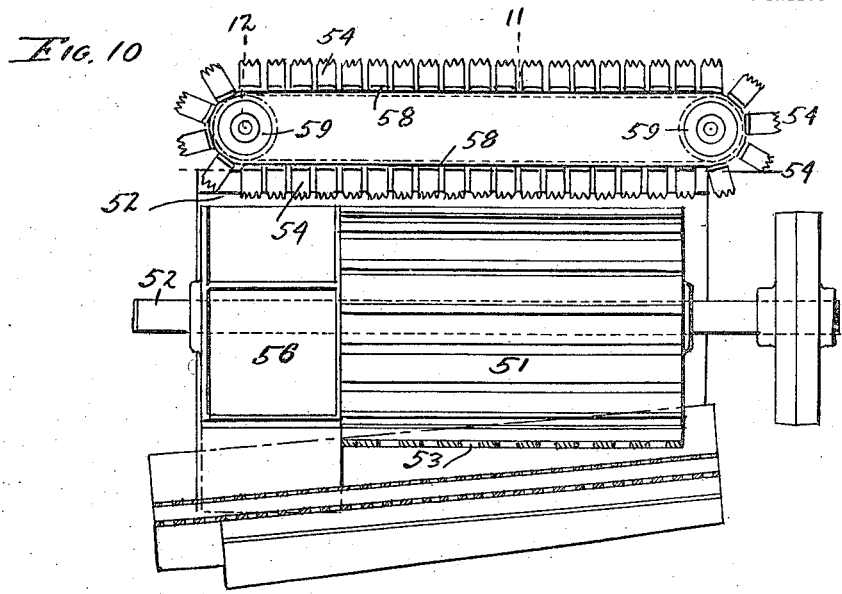
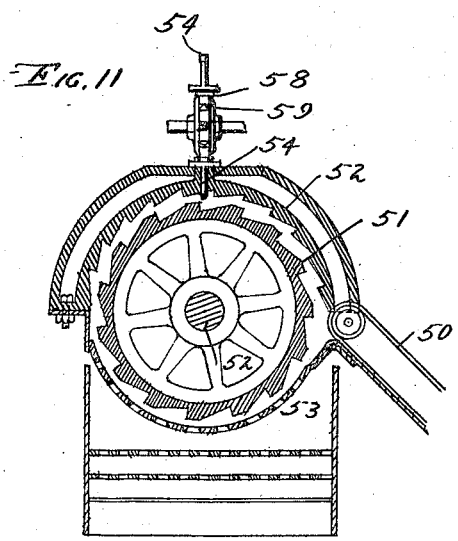
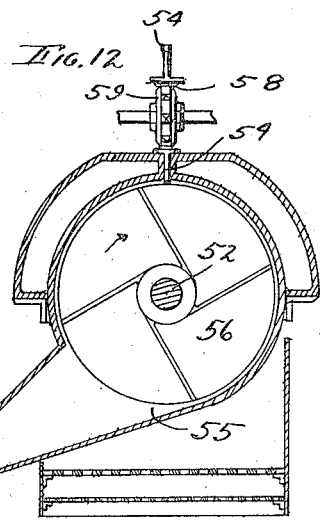
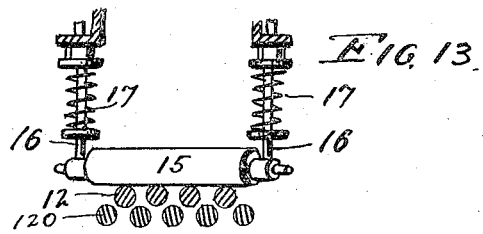

UNITED STATES PATENT OFFICE.

FRANK O'NEILL, JR., OF PHILADELPHIA, PENNSYLVANIA.

FIBROUS-PLANT-DECORTICATING MACHINE.

1,423,357. Specification of Letters Patent. Patented July 18, 1922.

Application filed November 28, 1917, Serial No. 204,329. Renewed February 13, 1922. Serial No. 536,342.

*To all whom it may concern:*

Be it known that I, FRANK O'NEILL, Jr., of Philadelphia, in the county of Philadelphia, and in the State of Pennsylvania, have invented a certain new and useful Improvement in Fibrous-Plant-Decorticating Machines, and do hereby declare that the following is a full, clear, and exact description thereof.

My invention pertains to the art of separating fiber from fiber bearing plants and in producing my invention I have had in view its adaptation to the treatment of plants of great variety such for example as flax, ramie, hemp, jute, sisal, etc., and generally stated my object is the provision of a separating mechanism of such construction and organization of elements as will subject the plants to an operation that will quickly, and with a minimum of waste or injury to the fiber, and therefore economically, separate the fiber from the elements naturally accompanying the same in the plant.

In the accompanying drawings:

Fig. 1 is a view in side elevation but somewhat diagrammatic of a decorticating mechanism embodying my invention, Fig. 2 is a top plan view thereof also somewhat diagrammatic, Fig. 3 is a vertical section on the line 3—3 of Fig. 1 through a portion of the first one of the series of decorticating mechanisms, Fig. 4 is a detail view of the brake for said decorticating device;

Fig. 5 is a detail view in section showing the blade and cooperating pair of rolls of the decorticating mechanism, the blade being sharp edged;

Figs. 6, 7 and 8 are similar views showing different forms of the plant engaging members of the decorticating mechanism;

Fig. 8ª is a detail view of a blade provided with hackling teeth;

Fig. 9 is a transverse section on the line 9—9 of Fig. 2 to illustrate the mechanism for transferring the plants from one carrier to the other;

Fig. 10 is a detail view in side elevation of the tow cleaning and seed separating device;

Fig. 11 is a cross section thereof on the line 11—11 of Fig. 10;

Fig. 12 is a cross section on the line 12—12 of Fig. 10;

Fig. 13 is a detail view of a device that may be used for applying pressure to the plant carrying apron cables.

Giving a preliminary general description of the machine shown in the drawings as one embodiment of my invention it comprises two series of decorticating mechanisms, a plant carrier for each series by which the plants are presented to the decorticating mechanisms of the series one after another and by which the plants are so held that the portions being acted upon by the decorticating mechanisms, extend at a sharp angle, preferably a right angle to the portions held by the carrier. The plants after being operated on for the portion of their length not gripped by the carrier are presented to the next series of decorticating mechanisms by another carrier which grips only the just finished portion of the plants so that as a result of the successive action of the two sets of decorticating mechanisms, the plants are decorticated throughout their length. Each of the decorticating mechanisms comprises a cooperating pair of plant engaging members that have a reciprocating or to and fro movement engaging and carrying the plants first in one direction and then the other and moving lengthwise of the plants as they carry them to and fro which has the important effect of imparting a shaking movement to the plants and which is also important in that it makes for simplification of the structure.

The machine parts are mounted on a frame 10 which in practice is preferably carried by wheels so that it may be readily transported, but no attempt has been made in the drawings to illustrate the frame work except in a general way or the mounting of it upon carrying wheels. For lightness and strength, the frame may be made of angle iron. At one end of the frame is a horizontal feed table or platform 11 upon which the plants are placed and arranged parallel and from which they are delivered to an endless carrier by which they are securely gripped for a portion of their length at one end, the remainder being free and by which they are delivered in succession to each of a series of decorticating members designated in the drawings respectively A, B, C and D. Said plant carrier is composed of two endless aprons placed one above the other with their contiguous runs situated in a plane which is the same as the plane of the feed table 11 and each apron is composed of a number of side by side endless cables, the cables 12 of the upper apron being carried over pulleys 13, and the cables 120 of the lower apron being carried over similar pulleys 14 and the cables of one apron lying opposite the spaces between the cables of the other apron (see Fig. 3) so that one so to speak knuckles into the other and thereby the interposed plants made to assume a devious form and hence will be very securely held. The cables or round belts of the lower apron in their upper run rest in longitudinally extending grooves in the upper side of a horizontal support 140 and preferably pressure is applied to the overlying cables of the upper belt as by means of a series of cross rollers 15 hung to turn freely in boxes in vertical rods 16, each of which is encircled by a coil spring 17 that acts to press the rollers with the desired force upon the cables. Other means may be employed for providing the desired pressure of the two aprons upon the interposed plant portions.

Immediately, or shortly after they are caught by the two carrier aprons, the free portions of the plants encounter the lower and forwardly and downwardly inclined edge of a guide, and thereby as the plants move along with the carrier, they are gradually bent downward at the edge of the apron so that finally the free portions of the plants hang vertically, while the carrier-gripped portions lie horizontally and when in this condition the plants are presented in succession to the decorticating mechanisms of the first series which as will appear act upon them by a pulling action and it is for that reason that the plants are bent as has been described so that there is no tendency to pull the plant from between the carrier aprons and thus a possible source of loss is avoided. Said guide for changing the position of the ungripped portion of the plants from horizontal to vertical or pendent is in the form of an endless belt 19 that is supported and moved by pulleys 19ª in a vertical position so that its lower run passes downward and forward from the table 11 alongside the cables or belts 12 and 120.

Each of the decorticating mechanisms A, B, C and D comprises two cooperating members adapted to engage the hanging or pendent portions of the plants on opposite sides thereof that move first in one direction passing lengthwise of the plants in such motion and out of engagement therewith and then in the opposite direction and in the embodiment of my invention illustrated in the drawings this to and fro motion is an oscillatory one. As shown in Fig. 3, one of the reciprocating plant engaging members is a blade 20 and the other member is a pair of rollers 21. The blade 20 is attached to the outer ends of a pair of arms 22 which are thereby connected, said arms 22 at their inner ends being mounted to swing on a shaft 23, the swinging movement being imparted thereto by connecting a crank extension 24 of the arm to one end of a connecting rod 25 whose other end is pivoted to the side of a crank disk 26 there being a crank disk 26 for each arm 22 of a pair and the two disks being mounted upon a shaft 27 to which is keyed a pulley 28 that is connected by a belt with a counter-shaft (not shown). The pair of rollers 21 are likewise supported at the outer end of two arms 29 also pivoted to swing on the shaft 23, said rollers being mounted close together in such position relative to the blade 20 that the latter may extend into the converging space between the pair of rollers and there are two pairs of rollers 21 and the supporting arms 29 of the two pairs are preferably connected together so that they constitute in effect a V-shaped frame and thus the blade 20 oscillates between the two pairs of rollers 21. The swinging movement of the pairs of rollers 21 is accomplished by the swinging motion of the blade 20. Thus with the plants hanging pendent and with the blade 20 on one side thereof and a pair of rollers 21 on the opposite side, the pair of rollers at such time being quite close to the pendent plants, the blade 20 being moved towards the plant the blade will engage the plants and force them gently in between the pair of rollers and the movement of the blade 20 continuing, the pair of rollers will thereby partake of the movement of the blade so that blade and rollers together travel lengthwise of the plants which will be bent over the edge of the blade by reason of the tangential relation of blade to the adjacent peripheral portions of the pair of rollers. The movement of the blade and rollers is continued until they pass out of engagement with the plants, for the travel of the blade and rollers must be to an extent that will accomplish that result and as soon as the plants are freed from the blade and rollers, the plants drop again to the vertical hanging position from which by the operation just described they are moved and in readiness for a similar treatment upon the return or reverse movement of the blade 20 and its cooperation with the other pair of rollers 21. Preferably a yieldable or cushioned connection is provided between the blade carrying arms 22 and the roller carrying arms 29, to retard the swinging movement of the blade 20 and prevent pinching or other injury to the fiber. As shown in the drawings that connection may consist of a pneumatic device in the form of a cylinder 30 pivotally connected to each arm 29 of a pair, and a piston 31 pivotally connected to each blade carrying arm 22 of a pair, the arrangement being in the nature of a dashpot. For adjustment sake one end of the cylinder may be in the form of a threaded plug or head 30ª.

For the purpose of permitting adjustment or variation of the pressure exerted by the blade 20 upon the interposed plants, I apply to the frame arms 29 a brake or friction device which consists of a hub 32 connected with such frame at one side thereof and a contractible and expansible brake band 33 between which and the periphery of the hub are placed segments 34 of friction material. The band 33 is divided or split and through arms or extensions 35 on opposite sides of the split passes a rod 36 that is fastened to one of the frame members 37 and upon which are two coil springs 38, one on each side of the pair of arms 35 and bearing at one end against one of the latter and bearing at its other end against an adjustable disk or collar 39 by which the tension of the spring may be adjusted and thus the retarding effect of the brake device on the roller carrying frame adjusted as may be desired.

It is desirable to provide a lateral support for the plants close to where they hang from the traveling support or conveyor from which they hang pendent during a decorticating operation, so as to sustain the plants under the pull of the decorticating blade and rollers when the plants are swung away from such conveyor, and said support is preferably in the form of an endless belt 40 preferably round in cross section which lies in a horizontal plane with one run close to the outside conveyor belt 12 from which the plants hang.

As shown in Fig. 6 instead of having the form of a blade 20 the member cooperating with the pair of rollers 21 may be a roll 201 with its periphery longitudinally ribbed and instead of the smooth periphery roll shown in Figs. 3, 4 and 5, rolls 210 with longitudinally ribbed peripheries may be employed. As shown in Fig. 7 which also illustrates the blade form member 20 a cushion device may be interposed between the sharp edge of the blade and the cooperating pair of rollers in the form of a band or apron 41 passing over the rolls; and as shown in Figs. 8 and 8ª the cooperating member corresponding with the blade 20 may be a thin bar or plate 42 having on its edge which enters between the pair of rollers 21 hackling teeth 43. Thus I do not limit myself to any one form of cooperating members; nor do I limit myself to the oscillatory form of reciprocating movement of the members.

The decorticating mechanism designated B in Fig. 1 instead of having rolls and blade lying parallel with the direction of travel of the conveyor they are inclined upward and onward in the direction of the travel of the conveyor and with the plants therewith for the purpose of having the decorticating devices begin their action on the plants towards their lower ends and progressively acting upon them lengthwise and towards the point of their suspension from the conveyor.

The speed of the successive decorticating mechanisms of the series A, B, C, and D is gradually increased and this may be accomplished as illustrated in the drawings by having the driving pulleys 28 of graduated diameter.

After leaving the last decorticating mechanism D, the plants, still in the grip of the carrier composed of the coacting two sets of cables 12 and 120 are delivered to an endless belt or carrier 44 which runs transversely of the direction of travel of said cables 12 and which receives and supports the plants in a horizontal position, they being thus changed from their depending position; and by such apron 44 the free end portions are delivered to a second and similar carrier composed of an upper apron 45 and a lower apron 46 which together constitute a plant gripping and carrying device in all respects like the other and delivering the yet untreated portions of the plants to the successive action of the series of decorticating mechanism, $A^1$, $B^1$, $C^1$, and $D^1$, that are the duplicate of the decorticating mechanism A, B, C and D. The grip of the first plant carrier upon the plants is not released until the second plant carrier has gripped the plants. By referring more particularly to Figs. 1 and 2, it will be seen that the upper run of the carrier belt 44 (which is the one that receives the plants) is below the portions of the two sets of cables 12 which grip the plants at the time they are to be received by the carrier 44 and is quite close thereto and such upper run of the carrier belt 44 passes above the upper run of the lower apron 46 of the second pair of gripping and carrying cables to which the plants are delivered and by which they are gripped shortly before they are released by the first set of cables 12. A guide is provided for facilitating the lifting of the pendent plants from a vertical to a horizontal position so that they are delivered in a horizontal position to the transfer apron 44, this provision being especially useful in the case of plants with long fibers such as hemp, ramie and the like. Said guide is in the form of an endless belt 47 that extends transversely but obliquely from the first conveyor to the second and with its upper run extending at an incline upward from a point below the first conveyor to the upper run of the transferring apron 44, this described position being obtained by two end pulleys 48 and an intermediate pulley 49 over which it passes and by which it is supported, these pulleys being mounted on shafts suitably supported by the frame of the machine. Thus as the pendent plants are carried along by the first conveyor they first strike the obliquely and upwardly inclined belt 47 and by reason of its inclination and motion of its upper run towards the upper side of the transferring apron 44, the pendent plants are gently and efficiently lifted to a horizontal position and deposited in such position upon the transferring apron 44.

The short fiber or tow and the seed are dropped to an apron or carrier 50 in the bottom of the machine running lengthwise thereof and are delivered thereby to a separating mechanism at the far end of the machine. Said separating mechanism comprising thrashing means consisting of an externally ribbed drum or cylinder 51 mounted on a horizontal shaft 52 and revolving in a shell composed of an upper internally ribbed section or concave 52 and a lower perforated or sieve section 53 by which the separation of the seed and tow is effected. Traveling lengthwise of a vertical slot in the top of the upper section or concave 52 and reaching into the space inside said concave is an endless series of toothed plates or blades 54 which engage the tow and carry it lengthwise of the cylinder and deliver it into a chamber 55 at one end of the cylinder within which rotates a fan or beater 56 also mounted on the shaft 52 and by which the clean tow is expelled through a spout 57. The fan 55 may be fixed to the shaft to rotate at the same speed as the drum 51 or it may be loose therefrom and driven at a different rate of speed. The blades 54 are secured to an endless sprocket chain 58 which passes over a suitable sprocket wheel 59.

The shaft 52 has a band wheel 60 belted to the engine and from the shaft 52 by suitable belt and other form of gearing not necessary to be described, motion is imparted to the moving members of the machine.

Having thus described my invention what I claim is:

1. In a machine of the class described, the combination of plant supporting means, a decorticating mechanism comprising oppositely disposed to and fro moving plant engaging members, one of said members receiving its movement from the other, and means for imparting movement to the latter, said members being mounted for simultaneous movement in the same direction, and one being movable relative to the other.

2. In a machine of the class described, the combination of plant supporting means, and a decorticating mechanism, comprising coacting members mounted for simultaneous to and fro motion crosswise of the plant, and one imparting movement to the other and movable relative to the other.

3. In a machine of the class described, the combination of plant supporting means, and a decorticating mechanism, comprising coacting members mounted for simultaneous to and fro motion crosswise of the plant, and one imparting movement to the other and movable relative to the other, one member being of blade form and the other of rollers.

4. In a machine of the class described, the combination of plant supporting means, and a decorticating mechanism comprising a reciprocating plant engaging member, and cooperating plant engaging members situated on opposite sides of said reciprocating member and between which it reciprocates, said other members also being reciprocatory.

5. In a machine of the class described, the combination of plant supporting means, a decorticating mechanism comprising a reciprocating plant engaging member and cooperating plant engaging members situated on opposite sides of said reciprocating member and between which it reciprocates, said other members also being reciprocatory and receiving motion from the member lying between them.

6. In a machine of the class described, the combination of plant supporting means, and a decorticating mechanism comprising reciprocating alternately acting opposing plant engaging members, the plant engaging members having a movement in each direction that carries them far enough to pass out of contact with the plant before the opposite movement begins.

7. In a machine of the class described, the combination of plant supporting means, and a decorticating mechanism comprising oscillatory alternately acting opposing plant engaging members, the plant engaging members having a movement in each direction that carries them far enough to pass out of contact with the plant before the opposite movement begins.

8. In a machine of the class described, the combination of plant suspending means, a decorticating mechanism situated beneath the same and comprising two sets of alternately acting plant engaging members, the plant engaging members having a movement in each direction that carries them far enough to pass out of contact with the plant before the opposite movement begins.

9. In a machine of the class described, the combination of plant suspending means, a decorticating mechanism situated beneath the same and comprising two sets of alternately acting plant engaging members, and means for imparting the movement of one member of a set to the other member in the same direction, whereby both simultaneously move in the same direction.

10. In a machine of the class described, the combination of plant suspending means, a decorticating mechanism situated beneath the same and comprising two sets of alternately acting plant engaging members, means for imparting the movement of one member of a set to the other member in the same direction, whereby both simultaneously move in the same direction, and a yieldable connection between said members.

11. In a machine of the class described, the combination of plant supporting means, and a decorticating mechanism comprising cooperating swinging plant engaging members each having its own pivoted support and one of which is movable from the other, and a brake device for the one that is moved by its co-operating member.

12. In a machine of the class described, the combination of a traveling plant support from which the plants hang pendent, a traveling lateral support for the plants contiguous to either point of suspension, and a decorticating mechanism comprising opposed reciprocating plant engaging members.

13. In a machine of the class described, the combination of plant carrying means, and a series of independently acting decorticating mechanisms each comprising opposing reciprocating plant engaging members, the successive decorticating mechanisms moving at increased speed.

14. In a machine of the class described, the combination of a traveling plant carrier and a decorticating mechanism comprising opposing to and fro plant engaging members that have plant engaging surfaces that extend at an incline to the direction of travel of the plant conveyor.

15. In a machine of the class described, the combination of a horizontal plant conveyor gripping the plants for a portion of their lengths, and a traveling guide at one side of said conveyor and inclined downward and forward in the path of plants carried by the conveyor, to bend the same downward.

16. In a machine of the class described, the combination of successively acting plant conveyors, a decorticating mechanism associated with each of said conveyors, and means for transferring the plants from one conveyor to the other comprising a carrier having a surface moving from one conveyor to the other, and an obliquely extending guide in the path of the plants carried by the conveyor from which they are to be delivered.

17. In a machine of the class described, the combination of successively acting plant conveyors, a decorticating mechanism associated with each of said conveyors, and means for transferring the plants from one conveyor to the other comprising a carrier having a surface moving from one conveyor to the other, and a traveling obliquely extending guide in the path of the plants carried by the conveyor from which they are to be delivered.

18. In a machine of the class described, the combination of decorticating mechanism, a thrashing mechanism comprising a cylinder and a concave to which certain products of the decorticating mechanism are delivered, a tow receiving chamber, and a device traveling in the space between the cylinder and the concave and to said tow chamber.

19. In a machine of the class described, the combination of plant suspending members, and a decorticating mechanism comprising oppositely disposed plant engaging members one of which is a working edge, and means for moving said members in directions simultaneously both transversely and longitudinally of the suspended plants whereby said members act upon the plants with a drawing motion.

20. In a machine of the class described, the combination of plant suspending means, and a decorticating mechanism comprising oppositely disposed plant engaging members one of which is a working edge and the other a pair of parallel rolls, and means for moving said members simultaneously both transversely and longitudinally of the suspended plant whereby said members act upon the latter with a drawing motion.

21. In a machine of the class described, the combination of plant suspending means, a decorticating mechanism comprising oppositely disposed plant engaging members one of which is a working edge and the other a pair of parallel rolls, and means for moving said members simultaneously both transversely and longitudinally of the suspended plant whereby said members act upon the latter with a drawing motion, the member having the working edge being movable towards and from the other, and a cushion interposed between the two members.

In testimony that I claim the foregoing I have hereunto set my hand.

FRANK O'NEILL, Jr.